Patented Apr. 13, 1954

2,675,372

UNITED STATES PATENT OFFICE 2,675,372

POLYMERIZATION OF MONOMERIC VINYL COMPOUNDS

Harry W. Coover, Jr., and Joseph B. Dickey, Kingsport, Tenn., assignors to Eastman Kodak Company, Rochester, N. Y., a corporation of New Jersey No Drawing. Application July 9, 1952,
Serial No. 298,004

14 Claims. (Cl. 260—88.7)

This invention relates to a new process for polymerizing monomeric organic compounds containing a $CH_2=C<$ group. More particularly it relates to a process for polymerizing such monomeric vinyl compounds to obtain high molecular weight polymers.

It is known that vinyl monomers such as isobutylene, styrene, α-methyl styrene or vinyl ether, for example, can be polymerized by acid catalysts such as boron trifluoride, stannic chloride or aluminum chloride. The polymerization reaction taking place is understood to involve a cationic chain mechanism. However, this method has limited application inasmuch as vinyl monomers such as acrylonitrile or α-trifluoromethyl acrylonitrile are not polymerized by acid catalysts.

It is also known that certain vinyl monomers such as vinyl chloride, vinyl acetate or methyl methacrylate, for example, can be polymerized by the use of an organic peroxide catalyst such as benzoyl peroxide. The reaction taking place in such a polymerization is believed to involve a free-radical mechanism. This method is not suitable for the polymerization of all vinyl monomers since certain vinyl monomers such as α-trifluoromethyl acrylonitrile are resistant to polymerization by organic peroxide catalysts.

Efforts to polymerize styrene with sodium malonic ester (Chem. Zentr., vol. 70, I 730 [1899]) and to polymerize allyl cyanide with ethyl magnesium bromide as well as sodium and sodium ethoxide (Bull. Soc. Chim., Belg., vol. 32, page 317 [1923] and Bull. Soc. Chim., Belg., vol. 35, page 239 [1926] gave mainly dimers and trimers and in no case was any high molecular weight polymer obtained.

We have discovered that the trialkyl phosphines, the trialkyl arsines and the trialkyl stibines are active polymerization catalysts for monomeric organic compounds containing a $CH_2=C<$ group. In accordance with the process of our invention all the vinyl monomeric compounds specifically referred to hereinbefore are readily polymerized to high molecular weight polymers. Thus acrylonitrile which is not polymerized by acid catalysts is readily polymerized by the process of our invention. Similarly, α-trifluoromethyl acrylonitrile which is not polymerized by acid catalysts and which is resistant to polymerization by peroxide type catalysts is readily polymerized to a clear, hard, moldable polymer by the process of our invention. Other vinyl monomeric compounds that can be readily polymerized in accordance with the process of our invention include, for example, methyl-α-trifluoromethylacrylate, methyl-α-difluoromethylacrylate, ethyl-α-trifluoromethylacrylate, ethyl-α-difluoromethylacrylate and n-propyl-α-trifluoromethylacrylate.

The process of our invention is particularly of value for the polymerization of organic monomeric compounds containing a $CH_2=C<$ group which are resistant to polymerization. The organic monomeric compounds containing a $CH_2=C<$ group which are difficult to polymerize are those which can be considered as having a low electron availability on the double bond. For example, acrylonitrile is considered as having a much lower electron density or availability on its double bond than propylene. Compounds of the type

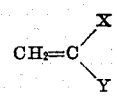

wherein X and Y each represents an electron-active group such as CN, $CF_3$, $NO_2$, $CONH_2$, $SO_3H$, $SO_3$ alkyl, COOH or COO alkyl and wherein one of the members X and Y may be hydrogen are considered to have relatively low electron availability on the carbon double bond and are representative of the vinyl monomers which are resistant to polymerization. In general these compounds are readily polymerized to high molecular weight polymers by the process of our invention.

We are aware than U. S. Patent 2,520,601 discloses the polymerization of ethylenic compounds of the vinyl or acrylic type with unsaturated alkyd resins using as catalysts both an organic peroxide and a phosphine having the general formula:

where R is alkyl or aryl and $R_1$ and $R_2$ are hydrogen or alkyl groups. Triethyl phosphine, tributyl phosphine, triamyl phosphine and trioctyl phosphine are disclosed as examples of tertiary phosphines. The process of this patent differs from that of the present invention in a number of important respects. One, the patent teaches that both an organic peroxide and a phosphine should be employed in the polymerization reaction whereas in the polymerization process of the present invention an organic peroxide catalyst is not necessary and is not employed. Two, the patent teaches the polymerization of a vinyl type compound with unsaturated alkyd resins whereas in the process of the present invention only a vinyl monomer or monomers (vinyl) is employed.

The use of trialkyl phosphines, trialkyl arsines or trialkyl stibines having 1 to 4, inclusive, carbon atoms in each of the alkyl groups is preferred. Trimethyl phosphine, triethyl phosphine, tri-(n-propyl) phosphine, tri-(n-butyl) phosphine, trimethyl arsine, triethyl arsine, tri-(n-butyl) arsine, trimethyl stibine, triethyl stibine, tri-(n-butyl) stibine, tri-(n-amyl) phosphine, tri-(n-octyl) phosphine, tri-(n-amyl) arsine, tri-(n-octyl) arsine, tri-(n-amyl) stibine and tri-(n-octyl) stibine are representative of the polymerization catalysts employed in the process of our invention.

As indicated hereinbefore, the process of our invention can be carried out using one or more than one monomeric organic compound containing a $CH_2=C<$ group. Where two or more monomeric organic compounds containing a $CH_2=C<$ group are polymerized together in accordance with our process, copolymers are obtained. When copolymers are prepared in accordance with the process of our invention, variable amounts of the two or more monomeric compounds containing a $CH_2=C<$ group can be used. Thus, varying amounts of two or more vinyl monomeric compounds having one or more strongly electronegative groups on one of the double bonded carbon atoms can be employed, for example.

The polymerization reaction can be carried out at a temperature ranging from $-80°$ C. to $100°$ C. However, temperatures lower than $-50°$ C. are seldom used and, as indicated hereinafter, in many cases the reaction is carried out at $0°$ C. to $100°$ C. Where the polymerization is carried out in an inert solvent the concentration of monomer or combined monomers can be varied widely. For practical operation the concentration of the monomer should be at least 1% by weight of the solvent employed and can range from 1% to 25% or more by weight of the solvent employed.

The amount of the trialkyl phosphine, trialkyl arsine or trialkyl stibine polymerization catalyst employed can range from as low as 0.01% to as high as 25% or more of the total weight of the monomer or monomers employed. Ordinarily the amount of polymerization catalyst employed does not exceed 2% of the total weight of the monomer or monomers employed. It is possible to use several times the highest amount of catalyst above mentioned in which case the trialkyl phosphine, the trialkyl arsine or the trialkyl stibine catalyst functions not only as a catalyst but also as a reaction medium at the same time.

The polymerization reaction can be effected in mass or in the presence of an inert diluent. Inert diluents that can be employed include, for example, water, acetone-water mixtures, 1,4-dioxane, acetonitrile, isopropyl ether and alcohols such as methanol, ethanol, n-propanol, etc. The monomeric organic compounds containing a $CH_2=C<$ group can also be emulsified in a liquid in which they are insoluble and the emulsion then subjected to polymerization in accordance with the process of our invention in the presence of one or more of the trialkyl phosphine, trialkyl arsine or trialkyl stibine polymerization catalysts. When the monomer employed is insoluble in water, it can be suspended therein, for example, by starch and polymerized in bead form in the presence of one or more of the trialkyl phosphine, trialkyl arsine or trialkyl stibine polymerization catalysts.

The following examples illustrate the new polymerization process of our invention.

*Example 1*

Several drops of triethyl phosphine were added to 10 grams of acrylonitrile at room temperature. After a short time, a vigorous reaction began and within a few minutes the acrylonitrile began boiling. The polymerization reaction which takes place was complete after 30 minutes. The procedure just described gives rather low molecular weight polymers when acrylonitrile is the monomer. If the reaction temperature is maintained at room temperature or below, a higher molecular weight polymer is obtained.

*Example 2*

Ten grams of acrylamide and 3 grams of triethyl arsine were dissolved in 20 ccs. of acetonitrile and the resulting reaction mixture was heated to gentle reflux for several hours. The precipitated polymer was obtained in almost a theoretical yield.

*Example 3*

Several drops of tri-(n-butyl) stibine were added to 5 grams of methyl-$\alpha$-trifluoromethylacrylate cooled to $0°$ C. The polymerization reaction started immediately and was complete within a few minutes. There was obtained a clear, hard, moldable polymethyl-$\alpha$-trifluoromethylacrylate. This polymer did not support combustion.

Equivalent amounts of methyl-$\alpha$-difluoromethylacrylate, ethyl-$\alpha$-trifluoromethylacrylate, ethyl-$\alpha$-difluoromethylacrylate or n-propyl-$\alpha$-trifluoromethylacrylate, for example, can be used in place of methyl-$\alpha$-trifluoromethylacrylate in the above example to obtain the corresponding homopolymers.

Similarly, an equivalent amount of trimethyl phosphine, triethyl phosphine, tri-(n-propyl) phosphine, trimethyl arsine, triethyl arsine, trimethyl stibine and triethyl stibine, for example, can be used in place of tri-(n-butyl) stibine in the reactions indicated in this example to obtain similar resinous polymers.

*Example 4*

10 grams of $\alpha$-trifluoromethyl acrylonitrile were added to 20 ccs. of diisopropyl ether and the resulting reaction mixture was cooled to $-50°$ C. One gram of trimethyl phosphine was slowly added to the reaction mixture over a period of one hour. Polymerization was complete shortly after the addition of the trimethyl phosphine. The polymer precipitated from the reaction mixture as rapidly as it was formed and was obtained in almost a theoretical yield.

*Example 5*

10 grams of $\alpha$-trifluoromethyl acrylonitrile were added to 20 ccs. of acetonitrile and the resulting reaction mixture was cooled to $-30°$ C. One gram of trimethyl arsine was slowly added to the reaction mixture over a period of one hour. Polymerization was complete shortly after the addition of the trimethyl arsine. The polymer formed was precipitated by pouring the reaction mixture into water and was obtained in almost a theoretical yield.

*Example 6*

Several drops of trimethyl phosphine were added to 10 grams of methylvinyl sulfonate. The reaction mixture thus obtained was heated in a closed and sealed vial at 100° C. for a period of 12 hours. At the end of this heating period the polymerization was essentially complete. The polymer formed was recovered as a clear, hard, moldable polymer readily soluble in acetonitrile.

We claim:

1. In a process for polymerizing monomeric organic compounds containing a $CH_2=C<$ group, the step which comprises polymerizing at a temperature of from —80° C. to 100° C. at least one monomer consisting of a monomeric organic compound containing a $CH_2=C<$ group in the presence of 0.01% to 25% by weight of the monomeric organic compound of a polymerization catalyst consisting of at least one compound selected from the group consisting of a trialkyl phosphine, a trialkyl arsine and a trialkyl stibine.

2. In a process for polymerizing monomeric organic compounds containing a $CH_2=C<$ group, the step which comprises polymerizing at a temperature of from —80° C. to 100° C. at least one monomer consisting of a monomeric organic compound containing a $CH_2=C<$ group in the presence of 0.01% to 25% by weight of the monomeric organic compound of a polymerization catalyst consisting of a trialkyl phosphine.

3. In a process for polymerizing monomeric organic compounds containing a $CH_2=C<$ group, the step which comprises polymerizing at a temperature of from —80° C. to 100° C. at least one monomer consisting of a monomeric organic compound containing a $CH_2=C<$ group in the presence of 0.01% to 25% by weight of the monomeric organic compound of a polymerization catalyst consisting of a trialkyl phosphine having 1 to 4, inclusive, carbon atoms in each of the alkyl groups.

4. In a process for polymerizing monomeric organic compounds containing a $CH_2=C<$ group, the step which comprises polymerizing at a temperature of from —80° C. to 100° C. at least one monomer consisting of a monomeric organic compound containing a $CH_2=C<$ group in the presence of 0.01% to 25% by weight of the monomeric organic compound of a polymerization catalyst consisting of a trialkyl arsine.

5. In a process for polymerizing monomeric organic compounds containing a $CH_2=C<$ group, the step which comprises polymerizing at a temperature of from —80° C. to 100° C. at least one monomer consisting of a monomeric organic compound containing a $CH_2=C<$ group in the presence of 0.01% to 25% by weight of the monomeric organic compound of a polymerization catalyst consisting of a trialkyl arsine having 1 to 4, inclusive, carbon atoms in each of the alkyl groups.

6. In a process for polymerizing monomeric organic compounds containing a $CH_2=C<$ group, the step which comprises polymerizing at a temperature of from —80° C. to 100° C. at least one monomer consisting of a monomeric organic compound containing a $CH_2=C<$ group in the presence of 0.01% to 25% by weight of the monomeric organic compound of a polymerization catalyst consisting of a trialkyl stibine.

7. In a process for polymerizing monomeric organic compounds containing a $CH_2=C<$ group, the step which comprises polymerizing at a temperature of from —80° C. to 100° C. at least one monomer consisting of a monomeric organic compound containing a $CH_2=C<$ group in the presence of 0.01% to 25% by weight of the monomeric organic compound of a polymerization catalyst consisting of a trialkyl stibine having 1 to 4, inclusive, carbon atoms in each of the alkyl groups.

8. In a process for polymerizing a monomeric organic compound consisting of α-trifluoromethyl acrylonitrile, the step which comprises polymerizing α-trifluoromethyl acrylonitrile at a temperature of from —80° C. to 100° C. in the presence of 0.01% to 25% by weight of the α-trifluoromethyl acrylonitrile of a polymerization catalyst consisting of at least one compound selected from the group consisting of a trialkyl phosphine, a trialkyl arsine and a trialkyl stibine.

9. In a process for polymerizing a monomeric organic compound consisting of acrylonitrile, the step which comprises polymerizing acrylonitrile at a temperature of from —80° C. to 100° C. in the presence of 0.01% to 25% by weight of the acrylonitrile of a polymerization catalyst consisting of at least one compound selected from the group consisting of a trialkyl phosphine, a trialkyl arsine and a trialkyl stibine.

10. In a process for polymerizing a monomeric organic compound consisting of acrylonitrile, the step which comprises polymerizing acrylonitrile at a temperature of from —80° C. to 100° C. in the presence of 0.01% to 25% by weight of the acrylonitrile of a polymerization catalyst consisting of triethyl phosphine.

11. In a process for polymerizing a monomeric organic compound consisting of acrylamide, the step which comprises polymerizing acrylamide at a temperature of from —80° C. to 100° C. in the presence of 0.01% to 25% by weight of the acrylamide of a polymerization catalyst consisting of triethyl arsine.

12. In a process for polymerizing a monomeric organic compound consisting of methyl α-trifluoromethyl acrylate, the step which comprises polymerizing methyl α-trifluoromethyl acrylate at a temperature of from —80° C. to 100° C. in the presence of 0.01% to 25% by weight of the methyl α-trifluoromethylacrylate of a polymerization catalyst consisting of tri-(n-butyl) stibine.

13. In a process for polymerizing a monomeric organic compound consisting of α-trifluoromethyl acrylonitrile, the step which comprises polymerizing α-trifluoromethyl acrylonitrile at a temperature of from —80° C. to 100° C. in the presence of 0.01% to 25% by weight of the α-trifluoromethyl acrylonitrile of a polymerization catalyst consisting of trimethyl phosphine.

14. In a process for polymerizing a monomeric organic compound consisting of α-trifluoromethyl acrylonitrile, the step which comprises polymerizing α-trifluoromethyl acrylonitrile at a temperature of from —80° C. to 100° C. in the presence of 0.01% to 25% by weight of the α-trifluoromethyl acrylonitrile of a polymerization catalyst consisting of trimethyl arsine.

References Cited in the file of this patent

UNITED STATES PATENTS

| Number | Name | Date |
|---|---|---|
| 2,520,601 | Lee | Aug. 29, 1950 |